United States Patent [19]

Lückhoff

[11] Patent Number: 4,881,820

[45] Date of Patent: Nov. 21, 1989

[54] METHOD OF AND DEVICE FOR PROPORTIONING AT LEAST ONE VISCOUS SUBSTANCE

[75] Inventor: Peter Lückhoff, Kierspe, Fed. Rep. of Germany

[73] Assignee: Reinhardt Technik GmbH & Co., Fed. Rep. of Germany

[21] Appl. No.: 157,131

[22] Filed: Feb. 11, 1988

Related U.S. Application Data

[63] Continuation of Ser. No. 910,633, Sep. 23, 1986, abandoned.

[30] Foreign Application Priority Data

Jan. 24, 1985 [DE] Fed. Rep. of Germany ....... 3502333
Aug. 16, 1985 [DE] Fed. Rep. of Germany ....... 3529486
Oct. 14, 1985 [DE] Fed. Rep. of Germany ....... 3536594

[51] Int. Cl.$^4$ .................... B01F 15/02; B01F 15/04
[52] U.S. Cl. ......................... 366/142; 222/135; 222/145; 366/152; 366/160; 366/162; 366/177
[58] Field of Search ............. 366/152, 160, 161, 162, 366/177, 179, 142, 182; 222/134, 135, 137, 145, 334, 63, 254; 425/376 R, 149, 543

[56] References Cited

U.S. PATENT DOCUMENTS

| 3,684,250 | 8/1972 | Roeser | 366/161 |
| 3,802,805 | 4/1974 | Roeser | 417/398 |
| 3,912,234 | 10/1975 | Peter | 366/262 |
| 4,090,695 | 5/1978 | Stone et al. | 222/63 X |
| 4,171,191 | 10/1979 | Krueger | 366/161 X |
| 4,207,047 | 6/1980 | Kolb et al. | 425/146 |
| 4,257,992 | 3/1981 | Schulte et al. | 425/543 X |
| 4,565,511 | 1/1986 | Ramisch | 222/63 X |

FOREIGN PATENT DOCUMENTS 0009118 4/1980 European Pat. Off. .
3329296 2/1985 Fed. Rep. of Germany .
2426561 12/1979 France .

Primary Examiner—Harvey C. Hornsby
Assistant Examiner—Scott J. Haugland
Attorney, Agent, or Firm—Cushman, Darby & Cushman

[57] ABSTRACT

A method of and a device for proportioning at least one viscous substance and specifically the components of viscous polycomponent mixtures, wherein each component is charged into respective squeezing unit and delivered into a mixing and discharge unit in a subsequent squeezing operation.

The inventive aspect of the method and the inventive device is characterized by the fact that the pressure in the squeezing unit is adapted to the operating pressure in the mixing and discharge unit prior to the squeezing operation.

3 Claims, 3 Drawing Sheets

METHOD OF AND DEVICE FOR PROPORTIONING AT LEAST ONE VISCOUS SUBSTANCE

This is a continuation of application Ser. No. 910,633 filed Sept. 23, 1986, now abandoned.

BACKGROUND OF THE INVENTION

The invention relates to a method of and a device for proportioning at least one viscous substance, and in particular to a method of and a device for proportioning the components of viscous polycomponent mixtures.

At present, the use of solventless two-component or two-pack systems, e.g. so-called "high-solid lacquers", IMC lacquers, varnishes etc. is being considered particularly in consideration of environmental aspects.

PRIOR ART

Methods and devices have become known to proportion and mix polycomponent systems, in which each component of the viscous polycomponent mixture is charged into a respectively associated squeezing unit, typically a plunger/cylinder unit, and then fed to a mixing and dispensing unit in a subsequent squeezing operation. In most cases, delivery pumps are employed to charge the squeezer units with the components at a pressure substantially lower than the pressure under which the components are ejected in the squeezing operation.

The handling of the aforementioned polycomponent sytems, and also of coating materials for thorough anticorrosion protection, with the known methods and devices encounters, however, certain difficulties for a number of different reasons - which has been recognized according to the present invention:

Particularly with "high-solid lacquers", IMC lacquers, varnishes, etc., the compressibility factors of the individual components may considerably differ. Moreover, the mixing ratio of the individual components is often extreme, mixing ratios exceeding 10:1 and even as high as 100:1 are not rare in such systems. At the same time, however, the components have to be proportioned in small and even tiniest quantities, often less than 1 g.

Any attempt to handle mixtures with components of highly different compressibility with known devices, at best results in a mix-proportioning of the starting section of the so-called "mix bead". With proportioning quantities in the gramme range, however, the entire mix bead becomes useless since the incorrectly proportioned section, which does not correctly set and/or produce different color shades, for instance, comprises an excessive share of the total mix bead.

SUMMARY OF THE INVENTION

The invention is therefore based on the problem of presenting a method of and a device for proportioning at least one viscous substance, specifically proportioning the components of a polycomponent mixture, permitting even the proportioning of small and even tiniest quantities of substances with a high compressibility or components with substantially different compressibility factors.

According to the present invention, the fact has been recognized that there is a surprising solution of the given problem according to the invention. The following finding has specifically been adopted as the basis:

In the known methods of and devices for proportioning at least one viscous substance, the charging pressure at which the squeezing unit is loaded ranges below the actual system pressure, i.e. below the pressure at which the components are squeezed out into the mixing and discharge unit. This is the reason why in the known devices the individual components undergo a different compression due to the pressure increase at the outset of the squeezing operation so that at the outset of the squeezing operation proportioning faults occur as a result of the fact that the squeezed-out volume no longer coincides with the volume displaced in the squeezing unit.

According to the present invention, this deficiency is avoided by a pressure adaptation taking place before the actual squeezing operation begins, which means that the pressure prevailing in the squeezing unit is adapted to the pressure in the mixing and discharge unit. As a result, the material is not compressed for the first time at the beginning of the squeezing operation so that constant mixing ratios are achieved throughout the entire "mix bead", which provides for proportioning of even minimum quantities.

The invention takes into account various possibilities in the pressure adaptor unit which sets the pressure in the squeezing units to the level prevailing in the mixing and discharge unit.

According to an aspect of the invention, the pressure adaptor unit may consist, for instance, of a unit controlling the delivery pressure of the supply pumps, specifically in cases where the pressure in the squeezing lines is lower than 10 bar; for instance, the mean delivery pressure of the supply pump is so regulated or controlled by control of the rotational speed of the delivery or supply pump that the pressure in the delivery lines equals the desired operating or squeezing pressure.

It is, of course, also possible to supply the viscous substances at a pressure higher than the level prevailing in the mixing and discharge unit and to reduce this pressure upon termination of the operation of charging the respective squeezing unit, e.g. by a pressure relief valve.

The embodiments of the pressure adaptor unit as characterized by the invention are suitable particularly for squeezing pressures up to 10 bar, i.e. for comparatively low squeezing pressures, since inexpensive and reliable delivery pumps are available for this pressure range. IMC systems, high-solid lacquers, etc., however, are frequently processed at operating pressures as high as several hundreds of bar. Other aspects of the invention characterize possibilities of adapting the pressure prior to the outset of the squeezing operation in this pressure range as well.

According to another aspect of the invention, each squeezing cylinder is provided with a pressure sensor for detecting the pressure prevailing inside the squeezing cylinder. When the valves in the delivery and squeezing line of the plungers of the squeezing cylinder are closed the pressure is adapted in a way that the pressure prevailing in the squeezing unit equals the pressure in the mixing and discharge unit. Only after completion of such pressure adaptation, the actual squeezing operation begins which is initiated by the valve opening in the squeezing line.

Another preferred embodiment of the pressure adaptor unit for higher operating pressures, i.e. operating pressures as high as several hundreds bars, is also provided. According to this embodiment, the pressure adaptor unit for each component is provided with at least one pressure-augmenting unit consisting of a plunger/cylinder unit, which communicates with the squeezing unit through a branch line. This inventive pressure-augmenting unit, which consists of a plunger/cylinder unit, does not only allow exact proportioning of one or several viscous substances to be discharged under pressure but also allows the embodiment of extremely short cycle times without impairment of the proportioning quality due to an additional mode of operation.

The inventive device for proportioning at least one viscous substance, and specifically for proportioning the components of a polycomponent mixture whose components exhibit substantially differing compressibility factors, can be operated in two modes when a pressure-augmenting unit is employed which is composed of a plunger/cylinder unit.

In the first mode of operation, the squeezing cylinder and the pressure-augmenting unit are initially charged by means of a delivery pump, for instance. After termination of the charging operation, the pressure is increased in this system from the supply level to the actual operating level. Upon termination of the pressure-augmenting step the actual squeezing operation is initiated.

This mode of operation offers the advantage that the volume of the pressure-augmenting unit may be comparatively small, relative to the volume of the squeezing unit; in a typical application, it ranges from 5 to 20% of the volume of the squeezing unit. There is, however, the disadvantage that it takes a comparatively long time to charge the system since charging takes place at the low pressure established by the delivery pump so that the pressure must be adapted later on.

In the second mode of operation, during the squeezing operation of the squeezing unit, the pressure-augmenting unit is charged by the delivery pump. During this operation, the valve between the squeezing unit and the pressure-augmenting unit is closed. After termination of the squeezing operation the valve between the pressure-augmenting unit and the squeezing unit is opened so that the squeezing unit is charged by a displacement of the plunger in the pressure-augmenting unit rather than by the delivery pump as was the case before. When the charging operation is finished, the valve between the pressure-augmenting unit and the squeezing unit is closed again whereupon the squeezing operation is resumed. There are various reasons why this mode of operation allows for very short cycle times between two application or squeezing operations.

On the one hand, it takes substantially less time to charge the squeezing unit since the charging operation is carried out at a pressure substantially higher than that prevailing during the charging by means of the delivery pump. On the other hand, the pressure augmentation in the squeezing unit, which takes a certain time as well, is no longer necessary since the material is charged from the pressure-augmenting unit already at a level corresponding to the operating pressure of the mixing and discharge unit. This mode, however, requires a pressure-augmenting unit with a volume slightly exceeding the volume of the squeezing unit or the volume to be squeezed out per squeezing operation.

This disadvantage is, however, sufficiently compensated by the fact that this mode of operation permits rapid application. It is possible, for instance, to operate an inventive device in a way that the application operations can be carried out for an interval of five seconds with one second intervals between the individual application cycles. Due to this fact, the inventive device is also suited for proportioning and application of quickly setting plastic materials or adhesives such as polyethylene, epoxy and silicon adhesives, and for cycled coating of workpieces on conveyor or assembly lines, which is necessary in the automotive and furniture industries.

In the past, only systems operating with several squeezers with overlapping squeezing cycles have been used to solve proportioning problems involving cycle periods in the range between 1 and 2 seconds.

Due to the inventive employment of the pressure adaptor units as charging stations for the actual squeezing units it has now become possible to operate systems where only a single squeezing unit is provided for each component, even with such short cycle periods.

This arrangement renders the inventive device so highly packaged that both the squeezing unit and the additional plunger/cylinder units may be mounted, for instance, at a swivel arm and can be approached to the application point so closely that the tube length through which the mixed substance is conveyed is considerably reduced.

Another aspect of the invention provides yet another advantageous application of the pressure adaptor unit which, according to the present invention, consists of an additional plunger/cylinder unit.

Due to the employment of the inventive pressure-augmenting unit, it has become possible to increase the bias or the pressure of the material in the squeezing cylinders to an optional settable level. This arrangement provides for a short-term variation of the volumes to be discharged so that, for instance, in application under robot is control "mix beads" of the desired thickness and length may be produced at a constant movement of the "robot arm".

A further aspect of the invention provides an advantageous improvement which provides for avoidance, with a maximum probability, of proportioning faults such as those which may occur specifically after extended periods of operation:

According to this aspect of the invention, it has become clear that proportioning faults in systems with a pressure adaptor unit can practically always be traced back to the cause that either the valve in the squeezing line is not or incompletely closed during the charging of the squeezing unit, or the valve provided in the delivery line is not or incompletely closed during the squeezing operation.

In the first case, the squeezing unit is not charged with the required volume of the viscous substance whereas in the other case, material is pushed back into the delivery line so that only a part of the pushed-back material arrives in the discharge device. In both cases, the specified volume of material is not supplied to the dispensing unit.

This is the reason why according to the invention, pressure sensors are provided, both in the delivery lines upstream of the gate valves specifically designed as non-return valves, and in the squeezing lines downstream of the gate valves. The sensors detect the pressure variation on a time base at the respective locations in the lines.

When the gate valve in the squeeze line is completely closed the pressure downstream of the gate valve must not change as long as the squeezing unit is charged. When the output signal from the sensor provided in the squeezing line varies during the period of charging the squeezing unit, either the associated gate valve is not closed or this valve does not completely close, e.g. due to contamination of the valve seat. On the other hand, the output signal from the pressure sensor provided in the delivery line must not vary during the squeezing operation, provided that the valve in the delivery line is correctly closed.

The pressure sensors provided according to the present invention thus allow for an exact indication about the condition of the valves arranged in the individual lines, this state being the only cause of proportioning faults in practice, as has been established according to the invention.

In the preferred improved embodiment of the invention, another gate valve is arranged both upstream of the sensor located in the delivery line and downstream of the sensor in the squeezing line. These valves are opened or closed respectively in conjunction with other valves in the other lines. This arrangement provides for the advantage that the sensor in the delivery line will not detect any pressure variations which may result, for instance, from the delivery pump, and/or that the sensor in the squeezing line will not detect any pressure variations which may be due, for instance, to the discharge device, which variations would improperly indicate the existence of leakage at the respective valves and thus proportioning faults even though they do actually not exist.

This invention can, of course, also be applied to any system comprising several squeezing units for each component, e.g. a system as disclosed in the German Patent Application No. P 33 29 296.5. In such a system, each squeezing unit is associated with a sensor "cut off" in both directions by a valve so as to avoid pressure variations created by the other squeezing unit so as to avoid improper indication of leakage at the valves.

DESCRIPTION OF THE DRAWING

The invention will be described in more detail hereinbelow, by means of embodiments with reference to the drawing wherein:

FIG. 1 is a schematic of a first embodiment of the invention wherein the delivery lines 10 and 11 supplying the basic component A and the curing agent B of a two-component plastic material are provided for the communication of pressure pumps 14 or 15, e.g. of the plunger type, with one squeezing cylinder 12 or 13, respectively, of a squeezing unit 16. One non-return valve 18 or 20, respectively, and an electrically or pneumatically controllable gate valve 18″ or 20″ each are provided in the lines 10 and 11. Squeezing plungers, which are shown only schematically, are associated with the individual squeezing cylinders. The extreme ends of the two squeezing plungers of the squeezing unit 16 are so mounted at a squeezing arm 19 that the squeezing cylinder 13 can be displaced in the direction of arrow 19′ so as to vary the mixing ratio.

Figure 1:
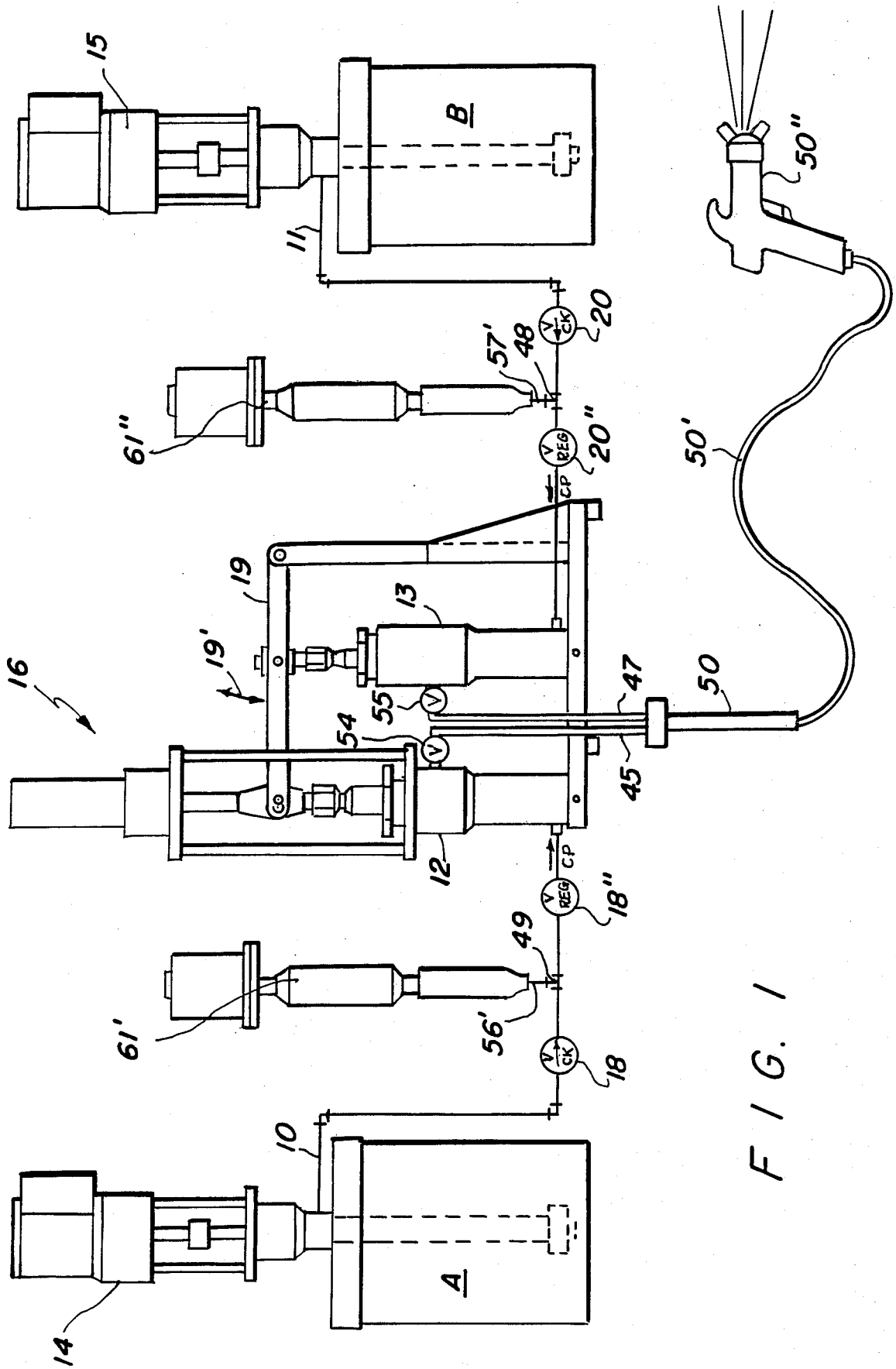
FIG. 1 is a schematic of a first embodiment.

The squeezing cylinders 12 or 13 are respectively connected to squeezing lines 45 or 47 into which the automatically operable gate valves 54 or 55 are inserted.

Pressure lines 56′, 57′ are connected at branch points 49, 48 and lead to the pressure-augmenting cylinders 61′ and 61″ which form each components of pressure-augmenting units not shown in more detail. The rams of a plunger are guided in the pressure-augmenting cylinders 61, the plunger being arranged for displacement in a pressure cylinder and for actuation by a pressure medium, preferably compressed air, on the cylinder side against the action of return springs. The return springs may be omitted provided that the pressure exerted by the material will be sufficient to return the plunger.

The aforedescribed device operates as follows:

When the squeezing cylinders 12 and 13 are charged with the basic component A, some material is pressed into lines 56 and the pressure-augmenting cylinders 61′ and 61″ whose rams are located in their initial top position with the pressure cylinder being unloaded.

When the system has been charged with the basic component A or the curing agent B, even before initiation of the actual squeezing operation, the pressure-augmenting units are actuated so as to displace them in a direction towards their other starting position, which raises the pressure in lines 45 and 47 and in the squeezing units 12 and 13 to the level of the operating pressure prevailing in the discharge unit 50 (mixer, tube, applicator) which is not shown.

In this step, the material is compressed so that it will not undergo any additional compression during the actual squeezing operation out of the squeezing units. This is the reason why the discharged volume of material of both the basic component A and the curing agent B equals the volume "covered" by the plungers in the squeezing unit. As a result, an exact mixture is achieved even in the initial stage of the discharge operation, independently of the extent by which the compressibility factors of the individual substances differ from each other.

Figure 2:
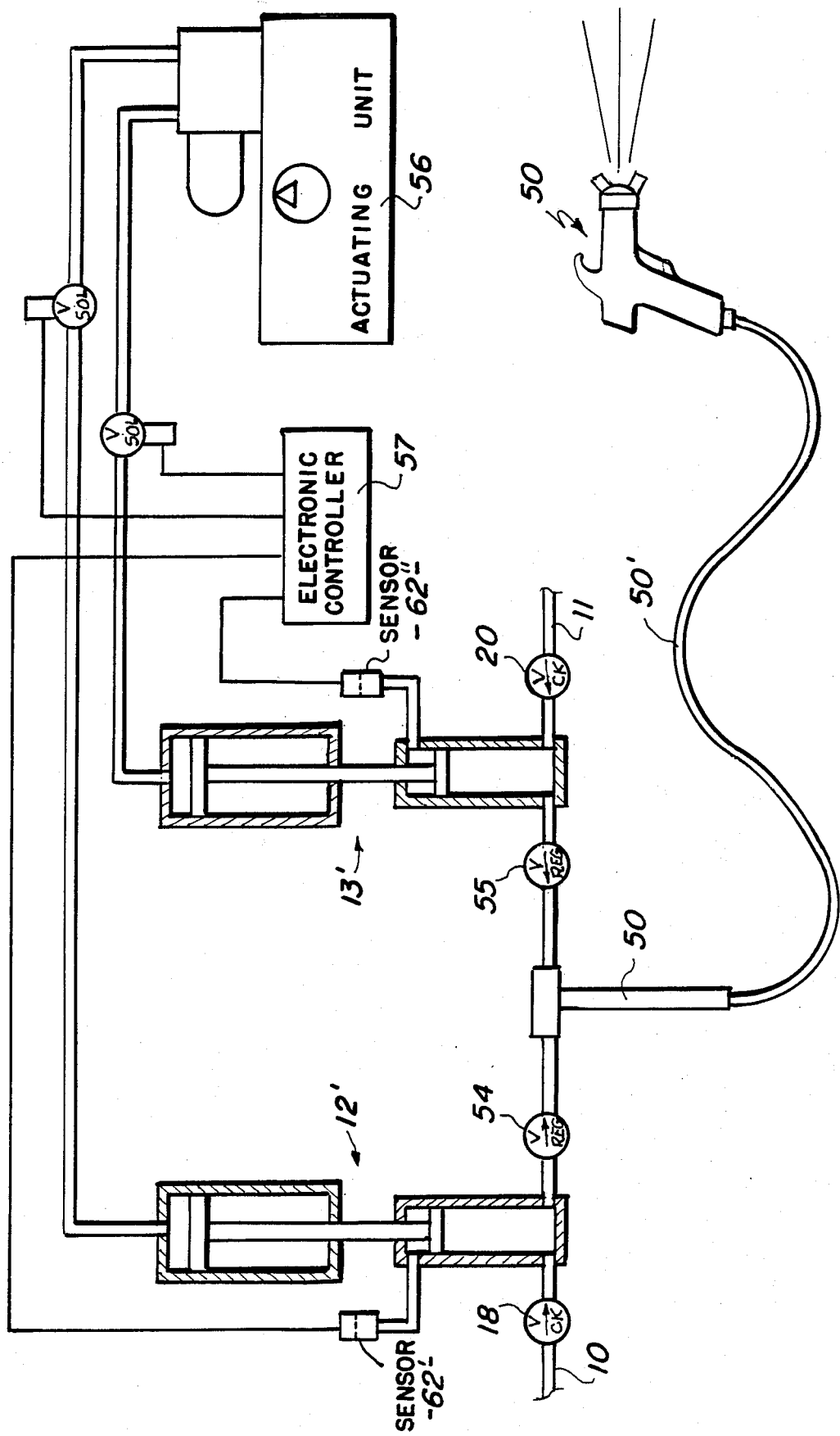
FIG. 2 illustrates a modification of the embodiment shown in FIG. 1.

FIG. 2 shows a modification of the embodiment described in relation to FIG. 1, wherein same parts as those of FIG. 1 are designated by the same numerals so that another description can be omitted here.

The pressure-augmenting units 61 are replaced here by sensors 62′ and 62″ in the squeezing cylinders 12 and 13 to gauge the pressure in these units. After charging of the squeezing units 12 or 13, respectively, first the plungers 12′ and 13′ are displaced for pressure increase until the pressure picked up by the sensors equals the operating pressure of the discharge unit 50, while the valves 18, 20, 54 and 55 are closed. Then the valves 54 and 55 open. An electronic controller 57—which may be realized by means of common means known in control systems so that a more detailed description may be dispensed with here—is provided to gauge the pressure and to control the valves 54 and 55 as well as the actuating unit 56 (for displacement of the plungers and for proportioning) which actuates the plungers 12′ and 13′ by means of compressed air.

Figure 3:
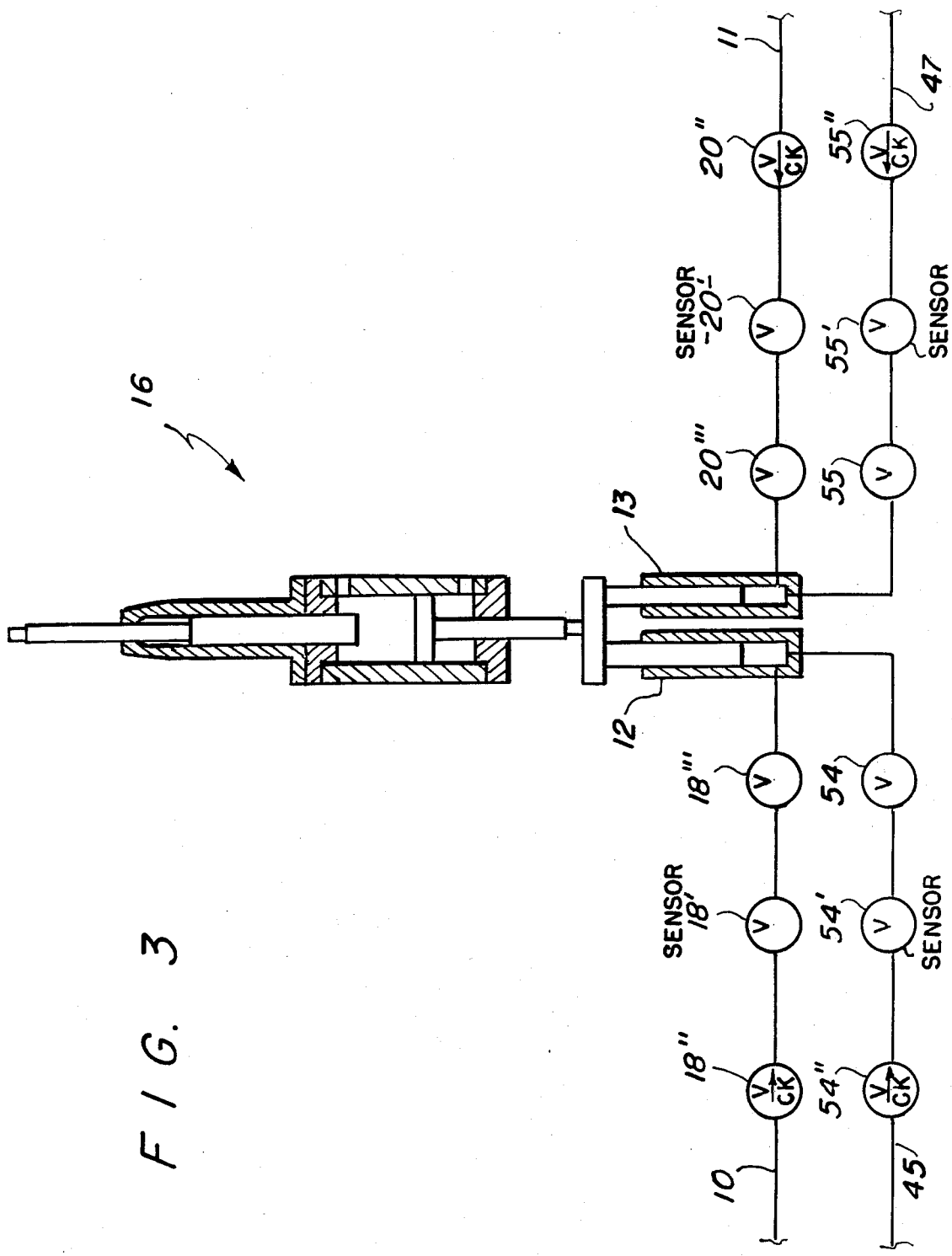
FIG. 3 shows a supplement to the embodiment of FIG. 1.

FIG. 3 shows a supplement to the embodiment described in relation to FIG. 1, wherein same parts as those in FIG. 1 are designated by the same numerals so that another description may be omitted here.

Two gate valves 18 and 18‴ or 20 and 20‴, respectively, are inserted into the lines leading to the squeezing cylinders 12 or 13; these gate valves can be jointly closed and opened. For instance, one of the valves in each valve pair may be closed automatically as a result of the return shock. The other valve (also termed safety valve) is then force-closed due to the valve of the non-return type closing, or is also designed as a non-return valve. It is, of course, also possible to actuate both valves, e.g. by a control system.

One pressure sensor 18' and 20' each is arranged between the two valve pairs 18 and 18''' or 20 and 20''' so as to detect the pressure in the line segment between the respective valve pairs.

The squeezing cylinders 12 and 13 are connected through squeezing lines 45 and 47 to a discharge device, which is not shown here, where the proportioned components are mixed and discharged. Two valves 54 and 54'' or 55 and 55'' each are also provided in the squeezing lines 45 and 47, a pressure sensor 54' or 55', respectively, being located between the valves of each pair so as to pick up the pressure in the line segment between the two valves. The valves 54 and 55 are normally automatically actuated gate valves which a control system closes upon termination of the squeezing operation and opens again at the outset of an other squeezing operation.

An evaluation circuitry (not shown) is provided downstream of the pressure sensors 18', 20', 54' and 55' to detect the variation of the output signals from the various pressure sensors on a time base.

According to the present invention, it has been recognized that in practice there are only the following causes of misproportioning in devices proportioning one or several viscous components:

The valves connecting the respective squeezing cylinder 12 or 13 to the discharge unit through the associated lines, are not or only incompletely closed when the cylinder is charged so that the respective cylinder is not filled with the correct volume of material.

The valves connecting the respective squeezing cylinders 12 or 13 to the delivery pumps through the associated lines, are not or only incompletely closed when the proportioned material is squeezed out from the cylinders so that during the squeezing operation some material is pushed back into the delivery lines with the result that less material than specified is delivered into the discharge device.

The cause of incorrect closure of the valves may, for instance, be an operating error (when the valves are provided for manual operation) or a contaminated valve seat so that the valve can no longer be correctly seated.

When the valves are correctly closed the pressure remains constant in the line segment between the valves so that the output signal from the respective pressure sensor remains constant as well. Any variation of the output signal from the sensors 18' and 20' during the squeezing operation or any variation of the output signal from the sensors 54' and 55' during the delivery operation is hence an indication of the fact that at least one of the valves is not or only incompletely closed—be it as a result of an operating error or due to malfunction—and that thus the occurrence of incorrect proportioning must be expected.

Any type of pressure intensifier which may be used in the pressure range occuring in the respective systems (up to several hundreds bar 5) may be considered for application as sensors which are suited to resolve the pressure variations which may typically arise in the respective system when, for instance, a valve seat is so contaminated that the valve cannot be completely closed. Such pressure sensors are commercially available so that their design need not be discussed in more detail here.

Any circuitry may be used to detect the variation of the output signals from the pressure sensors on a time base, e.g. a microprocessor circuit or a circuitry of an analog design which picks up the variation of the output signal from the sensors on a time base as a function of the operating condition of the system (cylinder charging/cylinder squeezing) and issues an alarm when the output signal from one of the sensors varies during an operating condition where the output signal should not vary. This alarm may be used, for instance, to switch off a polycomponent proportioning and mixing system and/or to signal the possibility of incorrect proportioning to an operator.

Since the design of such an evaluation circuit does not entail any difficulties a more detailed description thereof may be omitted here.

The invention has so far been described with reference to a particular example. However, the most various modifications are possible within the scope of the general inventive idea.

The inventive device may, for instance, also be employed to proportion a single component or more than two components. It is moreover possible to omit the additional valve which "cuts off" the associated sensor from the delivery pump or the discharge unit, provided that as a result of the system design these components will not create any pressure variations, in other words: when, for instance, the discharge device is closed while the squeezing cylinders are charged so that any pressure variations created by other conditions cannot occur.

It is, of course, also possible to apply the basic idea of the invention to a device where more than one squeezing unit is provided for each component, with the possibility of "overlapping" operation of the individual squeezing units with pressure compensation.

An example of such a system for a high system pressure is described in the German Patent Application No. P 33 29 296.5, and in the German Patent Application No. P 34 15 253.9 for medium system pressures. (Reference is herewith made to the contents of these patent applications.)

In such a system, such squeezing cylinder is associated with a combination comprising two gate valves and a pressure sensor therebetween, on both the charging and the squeezing sides. The gate valves are located in the line segment connecting the associated squeezing cylinder to the delivery line or squeezing line which is common to all squeezing cylinders for the respective component. The output signals from the individual pressure sensors are then evaluated in the same manner as in the devices where only a single squeezing unit is provided for each component.

It is also possible to arrange a sensor in the pressure adaptor unit, which issues a signal when the required pressure increase could not be achieved. This condition is an indication of incorrect charging of one of the squeezing cylinders, e.g. due to insufficient material volume. An extreme pressure increase in the line systems, which always occurs in conventional systems when, for instance, the basic component is running short, can thus be effectively avoided.

It is also possible to omit the arm connecting the two squeezing units and to provide rather a rigid connection between the two plunger/cylinder units. In such a case, however, the mixing ratio is determined by the geometry of the squeezing units.

Almost any system may be used to drive the individual units. Examples of such drives have been enumerated in the aforementioned German patent applications.

I claim:

1. An apparatus for metering and mixing viscous components of a multicomponent mixture, said apparatus comprising:
   (a) storage container means for storing respective components of said multicomponent mixture;
   (b) extrusion means (12, 13) for metering and discharging respective components of said mixture, said extrusion means including an extrusion chamber and at least one extrusion valve associated with each component of said mixture;
   (c) delivery pump means (14, 15) for pumping respective components of said mixture from said storage container means to said extrusion means via associated delivery lines (10, 11), each said delivery line including at least one check valve (18''', 20''') for preventing back-flow of said pumped components to said storage container means;
   (d) mixing and delivery means connected with said extrusion means by way of extrusion delivery lines (45, 47) and extrusion delivery valves (54, 55) for mixing said respective components in a mixing chamber (50) and for delivering a resulting multicomponent mixture to a utilization device (50'');
   (e) pressure equalizing means (61', 61''') for equalizing the pressure in said extrusion chamber and said mixing chamber prior to metering and discharging, said pressure equalizing means comprising respective piston cylinder units having a chamber in communication with said respective delivery lines of said storage container means of each said viscous component, said piston-cylinder units operable to fill upon supply of respective components to said delivery lines, and; said piston-units actuable by a pressure medium to maintain a predetermined pressure in the chamber thereof.

2. An apparatus for metering and mixing viscous components of a multicomponent mixture, said apparatus comprising:
   (a) storage container means for storing respective components of said multicomponent mixture;
   (b) extrusion means (12, 13) for metering and discharging respective components of said mixture, said extrusion means including an extrusion chamber and at least one extrusion valve associated with each component of said mixture;
   (c) delivery pump means (14, 15) for pumping respective components of said mixture from said storage container means to said extrusion means via associated delivery lines (10, 11), each said delivery line including at least one check valve (18''', 20''') for preventing back-flow of said pumped components to said storage container means;
   (d) mixing and delivery means connected with said extrusion means by way of extrusion delivery lines (45, 47) and extrusion delivery valves (54, 55) for mixing said respective components in a mixing chamber (50) and for delivering a resulting multicomponent mixture to a utilization device (50'');
   (e) pressure equalizing means (61', 61''') for equalizing the pressure in said extrusion chamber and said mixing chamber prior to metering and discharging;
   (f) upstream sensor means (18', 20') connected to respective said delivery lines (10, 11), said upstream sensor means located at at least one location upstream of said at least one check valve (18''', 20''');
   (g) downstream sensor means (54', 55') connected to respective said extrusion delivery lines (45, 47), said downstream sensor means located at at least one location downstream of said respective extrusion chamber, and;
   (h) means for generating an alarm signal based upon an evaluation of time-dependent progression of at least one sensor signal variation in relation to a predetermined operating condition of said apparatus.

3. An apparatus as recited in claim 2, further comprising at least one first sensor valve means (18'', 20'') and at least one second sensor valve means (54'', 55''), said first sensor valve means located upstream of said upstream sensor means and said second sensor valve means located downstream of said downstream sensor means, said first and second sensor valves operable in unison with said delivery and said check valves.

* * * * *